Aug. 4, 1936.　　　　F. L. O. WADSWORTH　　　　2,049,787
GLASS FEEDER
Filed Aug. 28, 1933　　　　2 Sheets-Sheet 1
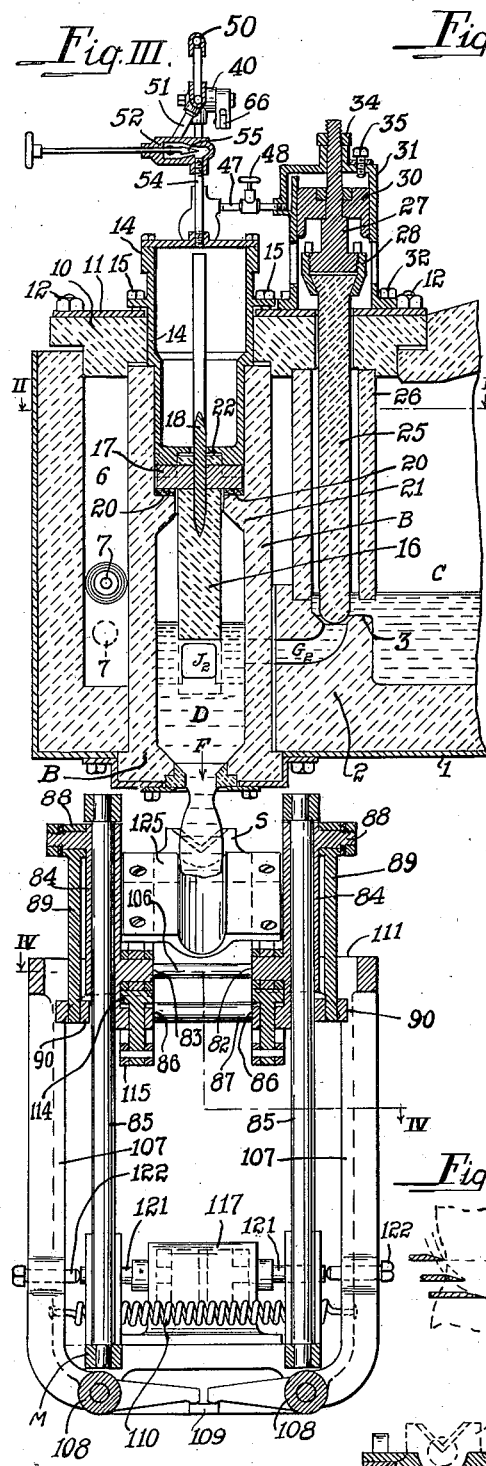
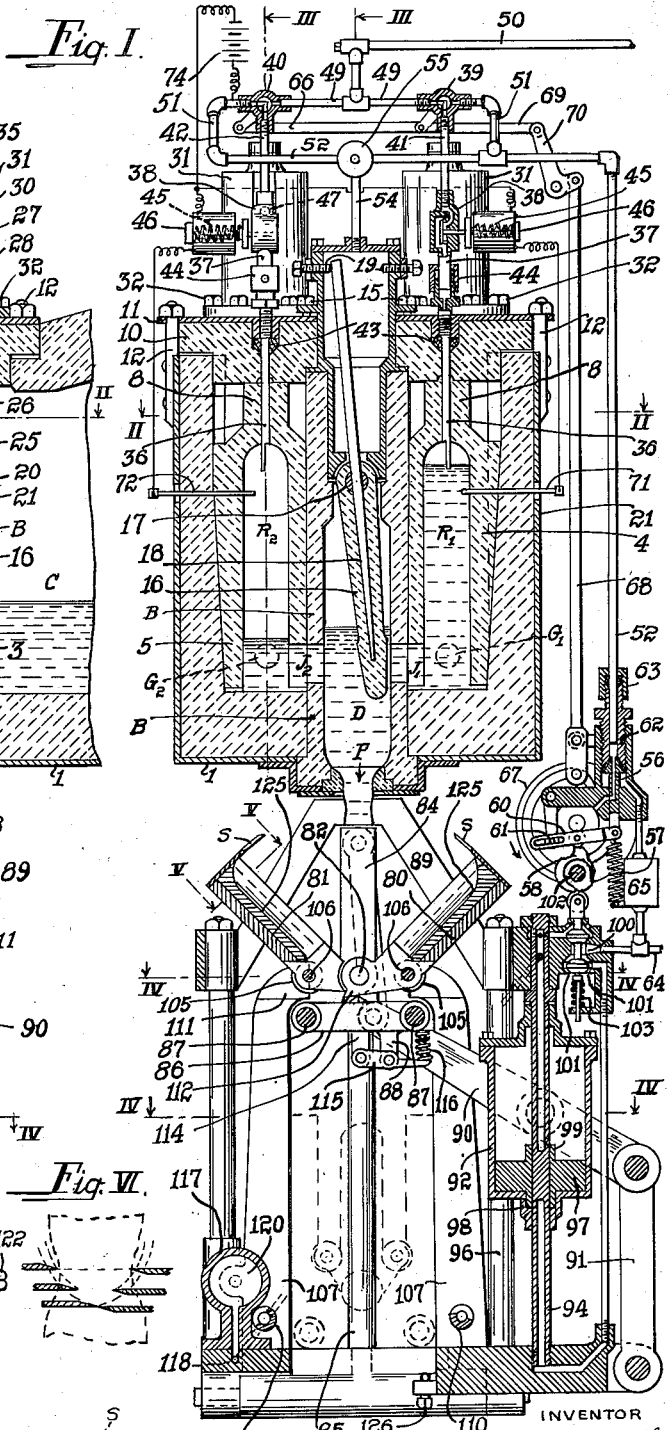

Aug. 4, 1936.   F. L. O. WADSWORTH   2,049,787
GLASS FEEDER
Filed Aug. 28, 1933   2 Sheets-Sheet 2
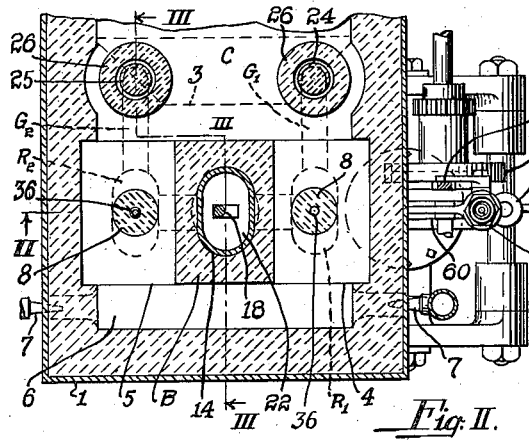
Fig. II.
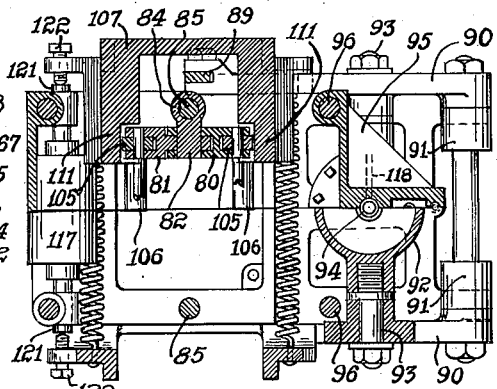
Fig. IV.
INVENTOR
Frank L. O. Wadsworth
By Green & McCallister
His Attorneys Patented Aug. 4, 1936

2,049,787

UNITED STATES PATENT OFFICE 2,049,787

GLASS FEEDER

Frank L. O. Wadsworth, Pittsburgh, Pa., assignor to Ball Brothers Company, Muncie, Ind., a corporation of Indiana Application August 28, 1933, Serial No. 687,043

19 Claims. (Cl. 49—55)

My invention relates to automatic glass feeders of the uninterrupted, or continuous, forced flow species, and particularly to that type of feeder in which the extrusion of the molten material is effected by the combined action of gravity and of an external force or pressure that is applied to the glass immediately above the delivery orifice, and is periodically and systematically varied in such manner as to expell the material in a series of rhythmic impulses which result in an alternate increase and decrease in the diameter of the flowing stream without at any time retarding or restraining its free and natural downward movement. This mode of operation augments the average rate of discharge through a flow orifice of any given size and thereby increases the delivery capacity of the feeder per unit of time—which is one of the important objects of my invention—and it also eliminates all difficulties due to a periodic or intermittent interruption, or cessation, or reversal of flow, such as characterize the usual forms of reciprocating plunger or fluid impulse (pressure and vacuum) feeders; and this is another purpose of the present improvements.

An additional object of my present invention is to provide means for continuously drawing fresh quotas of molten glass from a large tank or receptacle in which the material has been properly conditioned for use, and forcing them in uninterrupted succession into a segregation, or delivery, chamber; and then expelling the segregated masses from this chamber under a regulated super-atmospheric pressure which is periodically or progressively varied to alternately increase and decrease the rate of flow, and thereby alter the diameter of the extruded stream, at regular predetermined or preadjusted intervals, without interrupting its continuity; and a correlative purpose of the invention is to concurrently control the volumes of the successive quotas of glass which are thus positively transferred from the parent body in the supply receptacle to the point of regulated delivery.

Still another feature of my present improvements resides in the provision of self controlled instrumentalities for automatically regulating the action of the various forces which are employed to effect the continuous transfer of the glass from the source of supply to the segregation chamber, and the uninterrupted expulsion of the segregated material therefrom at the desired rate of flow.

Other objects and advantageous characteristics of my invention will be made apparent, to those skilled in this art, by the accompanying illustrations and descriptions of two exemplary embodiments thereof, which are presented as typical of many others that I have designed for the attainment of the results above set forth. In the drawings:

Fig. I is a transverse vertical cross section, partly in elevation, of one of these exemplifications of my improved feeder construction;

Fig. II is a horizontal cross section on the plane II—II of Fig. I;

Fig. III is a composite vertical section on the double plane III—III—III of Figs. I and II;

Fig. IV is another composite horizontal section on the double plane IV—IV of Figs. I and III;

Fig. V is a detail section on the plane V—V of Fig. I;

Fig. VI is a semi-diagrammatic view of the action of the shear blades in severing the continuously flowing stream of glass.

The organization shown in Figs. I to V inclusive comprises a forehearth chamber C, which is connected to a large melting tank (not shown), and which contains the parent body or supply of molten glass that is to be fed to some suitable fabricating apparatus, such as a press and (or) blow machine; a pair of accumulating or collecting chambers $R_1$ and $R_2$ which are positioned at the front end of the forehearth chamber, and are connected therewith by the inlet or supply passages $G_1$—$G_2$; and a segregation chamber D, which is connected to the chambers $R_1$ and $R_2$ by the large ports $J_1$ and $J_2$, and is provided at its lower end with removable ring bushing that forms a delivery orifice F. It also comprises a special form of shear mechanism which is positioned below, and in axial alignment with, the delivery orifice F, and which is designed to perform two functions; first that of severing the outflowing stream at periodic intervals, by a concurrent transverse and axial movement of the shear blades; and second that of immediately imparting to each cut-off section, or "gob", an accelerated downward movement, which is substantially in excess of that which would result from the action of gravity alone.

The forehearth is preferably supported in a suitable metal frame or boot 1—(that may also serve to carry the other parts of the feeder organization)—and is provided with a transverse bridge wall 2, which extends above the level of the glass in the chamber C, but which is formed with a depressed ledge, or step portion 3, that is somewhat below that level (see Fig. III). The oval collection chambers $R_1$ and $R^2$ and the oval segregation chamber D are formed in separate rectangular blocks (4, 5, and B) of molded pot clay, or other suitable refractory material, which are so dimensioned and shaped that they may be wedged together, side by side, between the walls of the forehearth chamber, and against the outer surface of the bridge wall 2, so as to form glass tight joints at the engaged faces. The forehearth walls extend beyond the front ends of the blocks 4, 5 and B to form an auxiliary heating chamber, 6, that can be heated at any desired degree by the gas or fuel oil burners 7—7; and the upper ends of the members 4 and 5 are reduced in size—to form the cylindrical necks 8, 8—and thus permit the products of combustion to pass from the space 6, over and around the tops and sides of the hollow blocks 4, 5 and B, and back into the forehearth and main tank chambers. This arrangement eliminates the necessity of providing any special flues or stacks for the escape of the burned gases from the forehearth enclosure; and also assists and facilitates the maintenance of a controllable equalized temperature in and about the several glass containing chambers D, $R_1$, $R_2$ and C.

The upper closed ends (viz. the necks 8, 8) of the two side chamber members 4 and 5, and the open end of the central chamber member B, are covered by a single large roof block 10, whose outer chamfered edges are closely engaged by the adjacent portions of the forehearth walls, and which is pressed down against the tops of the necks 8, 8, by the cooperating cover plate and bolt elements 11—12—12 etc., that form a part of the metal forehearth frame. This pressure forces the wedge shaped blocks 4 and 5 tightly against the adjacent sides of the forehearth walls and of the central block B, and assists the action of the molten glass in maintaining an air tight seal in and around the joints between the engaged parts. The open upper end of the central chamber D is covered by a metal dome 14, whose lower end engages with the oval opening at the top of the block B, and which is provided with an upper flared or shouldered section that bears against the adjacent end of this block, and is held in sealing contact with the latter by the flange bolts 15—15 etc.

The chamber D contains a swinging gate valve element 16, whose lower end is adapted to control the port openings $J_1$ and $J_2$, and which is supported and reinforced by a transverse trunnion shaft 17, and a longitudinally extending key rod 18, that projects above the trunnion member and is engaged, at its upper end, by two adjustable stop screws 19—19 in the walls of the dome 14. The outer ends of the supporting trunnion shaft rest on graphite block bearings 20—20, which are carried by an inwardly projecting ledge or shoulder 21, on the wall of the chamber D, and are held in position thereon by the slotted cap flange 22 at the lower end of the dome member 14. The gate valve 16—which floats in the molten glass in the chamber D—is thus permitted to rock or swing easily on its pivot support, and is prevented from coming into actual physical contact with the walls of the chamber by the engagement of the upper end of the reinforcing rod 18 with the limit screws 19—19.

The lower ends of the blocks 4 and 5 are cut away at one side to form rectangular notches, which are in registry with, and form a part of, the port openings $J_1$ and $J_2$, that lead from the chambers $R_1$ and $R_2$ to the central segregation chamber D; and they are each provided with a second circular opening that registers with the outer end of the corresponding inlet passage $G_1$ (or $G_2$) in the bridge wall 2. The passages $G_1$—$G_2$ curve upwardly at their inner ends, and terminate in a slightly flared or coned orifice on the horizontal step or ledge 3 of the bridge 2; and the effective inlet area of these orifices is controlled by vertical plunger valves or stoppers 24 and 25, which are preferably surrounded by tubular guard sleeves 26—26, that are clamped in position between the lower face of the roof block 10 and two semi-circular recesses on the upper surface of the bridge wall 2. The lower ends of the sleeves 26—26 are thus submerged in the glass in the forehearth chamber, and prevent any escape of the gases of combustion therefrom into the spaces around the members 24 and 25; but they terminate above the surface of the bridge wall ledge 3, and thus permit the free flow of glass to the inlet ends of the passageways G and $G_2$ (see Figs. II and III). The upper flared end of each plunger valve (24 or 25) is clamped against the lower head of a piston stem 27, by the coned collar 28; and this stem is secured to a piston 30, which slides in the upper part of an open sided cylinder 31 that is clamped down on the cover plate 11, by the bolts 32—32 etc. The stem 27 extends through the top cap of the cylinder 31 and is provided with an adjustable nut 34, that serves to limit the downward movement of the piston valve assembly 25 (or 24)—27; and the reverse upward movement of these parts is controlled by an adjustable screw 35 that is threaded through the cylinder cap and is engaged by the piston 30 at the top of its stroke.

Each of the chambers $R_1$ and $R_2$ is provided with a fluid supply conduit, which comprises a vertically adjustable tubular bolt 36 that passes through openings in the neck 8 and the superimposed roof block 10, and is threaded into the cover plate 11; and a pipe connection 37, which is slidably engaged in the enlarged head of the bolt 36, and which is preferably formed as an integral part of a cylindrical valve box 38, that is connected, in turn, to a two-way valve member 39 (or 40) by the pipe 41 (or 42). In order to prevent any leakage of air from the chamber $R_1$ (or $R_2$), through these adjustable connections, the roof block 10 is provided with coned recesses 43 which are packed with soft asbestos wool or other suitable material that is tightly compressed around the bolt members 36, and the heads of these bolts are also provided with threaded caps 44 that engage beveled packing rings for the pipe connections 37. Each valve box 38 contains a large disc valve, which opens inwardly (or toward the chamber $R_1$ or $R_2$), and which is normally held away from its seat by a compression spring 45; but the stem of the valve carries a soft iron armature which is positioned in close proximity to the poles of an electromagnet 46, that is sufficiently powerful to close the valve (against the tension of the spring 45) when the circuit through the magnet coils is closed (see infra). The upper end of each of these valve members (38—38) is also cross connected, with the top of the adjacent cylinder 31, by the pipe 47 which can be closed off by the hand valve 48 (see Fig. III).

The contiguous inlet or supply passages of the two-way valve elements 39 and 40 are connected, by the pipes 49—49, to a conduit 50, which leads to a suitable source of sub-atmospheric (vacuum) pressure, (not here shown); and the opposed inlet openings of these valves are connected (by the pipes 51) with a second conduit 52, which is also coupled to the upper end of the closed dome 14, by the pipe 54. Communication between the conduit 52 and the dome 14 is controlled by the manually adjustable needle valve 55; and the flow of fluid through the last described series of connections (51—52—54—55) is regulated, as a whole, by a mechanically operated plunger valve 56, which is moved, toward its open position, by the spring 57, and, toward its closed position, by the revolving cam 58 that is operatively connected to the valve by the rocking lever arm 60. One extremity of this arm is pivotally attached to the outer end of the valve stem and the opposite extremity is slotted to receive an adjustable fulcrum pin 61; and by moving this pin along the slot the throw of the valve can be easily varied without changing the cam 58. The upper end of the valve box is threaded to receive an axially adjustable valve seat 62, which is slidingly engaged by the adjacent end of the pipe 52 and is tightly connected thereto by threaded cap and beveled packing ring elements 63, similar to those (44) used at the sliding pipe joints 36—37. The opposite or forward end of the valve chamber is connected to a high pressure conduit 64; and a suitable relief or reducing valve element 65 may, if necessary, be interposed in this connection to limit the maximum pressure in the line 52 to any desired degree.

The actuating levers of the two-way valves 39 and 40 are coupled together by the bar 66, and are moved positively in both directions by the large face cam 67, and the connecting link and bell-crank-lever elements 68—69 and 70. The two cams 58 and 67 are mounted on separate shafts which are geared together in a two to one ratio (see Fig. II); but the cams are so shaped that the two-way valve system last described is operated twice in each revolution of the cam member 67, while the valve 56 is opened and closed (or partially closed) once in each rotation of the cam 58.

The two disc valves which control the pipe line connections 36—37—41 and 36—37—42 are operated in the following manner: Each of the blocks 4 and 5 is provided with an insulated contact bar 71 (or 72), which passes through the adjacent side wall of the forehearth chamber, and which projects a slight distance into the corresponding chamber $R_1$ (or $R_2$). Each of these bars is electrically connected to a terminal of the associated electro-magnet coils 46—46; and both of the remaining terminals of these coils are coupled in parallel to one pole of a battery 74 (or other suitable source of current). The other pole of the current source is connected to some portion of the pipe system which terminates in the tubular bolt elements 36—36. When either of the accumulation chambers $R_1$ or $R_2$, is filled with molten glass to the level determined by the setting of these vertically adjustable elements (36), the circuit is closed through the corresponding coil; and the disc valve which controls the fluid pressure connection with the filled chamber is closed, thus preventing a further withdrawal of air from the space above the glass, and preventing the latter from being drawn up into the end of the tube 36.

The conjoint or cooperative action of the various elements of the mechanism thus far described is as follows: When the parts are in the position shown in Figs. I, II and III, the pipe line 41, which leads to the accumulation chamber $R_1$, is in communication with the vacuum conduit 50; and the pipe connection 42 (to the chamber $R_2$) is opened to the super-atmospheric conduit 52. If the valves 48 are also open, (see infra) the sub-atmospheric pressure (suction) in the line 41 will cause the actuating piston 30 of the plunger valve 24 to be lifted against its upper limit stop 35; and the super-atmospheric pressure in the line 42 will concurrently depress the actuating piston of the other valve 25 to the lower limit of its stroke (as determined by the adjustment of the stop nut 34). Under these circumstances glass will be drawn into the receiving chamber $R_1$ through the open passageway $G_1$, until it touches the end of the tubular bolt 36, and closes the circuit through the right hand coil 46, to thereby close the disc valve in the corresponding valve box 38 (as explained above); while at the same time the molten material is being forced out of the chamber $R_2$ into the central segregation chamber D, and is being expelled from the delivery opening F under the combined effect of the gravity head of glass in the chamber D and the super-atmospheric pressure imposed thereon in both chambers ($R_2$ and D);—the return flow of glass, through the passage $G_2$ to the forehearth chamber, being prevented by the depressed plunger valve 25 (see Figs. I and III). The forced pressure-gravity flow of the molten glass from the delivery orifice will continue, (regardless of what may occur in the chamber $R_1$), until the continued clockwise rotation of the cam 58 closes, or partially closes, the adjustable control valve 56, in the line 52—52, and momentarily opens, or partially opens, this line to the atmosphere, (as shown in Fig. I); thus reducing or relieving the pressure acting on the glass in the chambers $R_2$ and D, and correspondingly decreasing its rate of outflow. This momentary diminution in the combined gravity-pressure-action on the continuously flowing material will result in a natural "necking" of the stream at a point close to the orifice (and facilitate its severance at this point);—the amount of this "necking" being governed and determined by the adjustment of the valve elements 61 and 62 and 65, and also, in part, by the setting of the throttling needle valve 55, which establishes a differential pressure in the chambers D and $R_2$ and thereby maintains a somewhat higher lever, or gravity head, of glass above the delivery outlet. But the relative position of the two cams 58 and 67 is so adjusted that immediately after the valve 56 is raised, (to reduce the pressure in the line 52), the two-way valves 39 and 40 are moved (through an angle of 90 degrees) to their reverse position—thus opening communication between the pipe connection 41 and the pressure conduit 52, and concurrently connecting the line 42 with the sub-atmospheric (vacuum) conduit 50—and the valve 56 is concurrently first opened and then again partially closed. The resultant establishment of a substantial super-atmospheric pressure in the line 41, opens the closed disc valve in that line, (against the pull of the electro-magnet 46); admits compressed fluid to the upper end of the previously charged chamber $R_1$; and forces the glass out of that chamber into the central segregation chamber D—the gate valve 16 opening automatically to permit this flow through the port $J_1$ and the plunger valve 24 closing automatically to prevent the return flow of glass through the passage $G_1$—while the concurrent opening of the line 42 to the vacuum connection

(50) also lifts the plunger valve 25, opens the passageway G₂, and permits glass to be drawn into the chamber R₂—the port J₂ being now closed by the above described movement of the gate valve 16—until the molten material rises to the level of the contact bolt 36 and thus automatically shuts off the vacuum connection to that chamber (as before described). When the cam 67 has moved through 180 degrees (while the cam 58 has revolved through 360 degrees in the opposite direction), one complete cycle of action is completed, and the above described operation is repeated, (with a reversed movement of the two-way valve system 39—40 etc.), to again bring all parts to the position shown in Figs. I, II and III.

It will be observed that in each cycle of action the valve element 56 makes one complete reciprocation (up and back); and that by changing the angular position, and (or) the contour of the cam 58, and (or) by adjusting the position of the parts 61—62, and (or) by altering the setting of the valves 55 and 65, any desired and predetermined control of the force which aids gravity, in effecting a forced extrusion of the glass from the delivery orifice—and any desired variation in that force during each cycle of extrusion action—can be readily exercised, for the purpose of regulating both the volume and the contour of each successively delivered stream section; and that, by exercising such control, the operator of the feeder can produce a series of uniformly shaped mold charges which are best adapted to subsequent treatment in the forming, or molding, machine. It will also be observed that the quantity of glass which is successively drawn into each collection chamber (R₁ or R₂), and is subsequently forced therefrom into the delivery chamber (D), can be regulated both by the movement (up or down), of the contact elements 36—36, and by the adjustment of the stop elements 34 and 35 (which vary the effective areas of the inlet passages G₁ and G₂ with respect to the port openings J₁ and J₂); and that the throttling action of the swinging gate valve 16, on a return flow of glass from the chamber D to either the chambers R₁ or R₂, can also be controlled by the adjustment of the stop screws 19—19.

If desired the connections 47 between the lines 41 and 42 and the plunger valve cylinders 31—31, may be closed by the valves 48; and the stops 34 and 35 may be set to establish any desired and fixed ratio between the effective flow areas of the passages G₁ and G₂ and the ports J₁ and J₂; this mode of use of the apparatus being made possible by the fact that the time available for filling each of the chambers R₁ and R₂ is substantially equal to the full cycle interval of charge expulsion, and that the automatic closing of the vacuum connections to each chamber, when it has been filled to a predetermined level, permits the use of a high vacuum (or very low sub-atmospheric pressure), without incurring any danger of sucking the molten material up into the pipes 36 and thus choking the latter with congealed glass.

It will now be apparent, to those skilled in this art, that I have provided a wide range of control adjustments,—and various automatically acting self control means—which will effectively regulate the operation of my improved feeder in maintaining a continuous, or uninterrupted outflow of molten material from the delivery orifice, and in periodically varying and regulating the rate of this outflow, so as to produce a regular and repeated series of stream sections of predetermined size and contour, from which a succession of uniform preshaped mold charges may be severed and delivered to a forming machine. I will now describe one embodiment of my improved high speed shear mechanism for severing the constantly flowing stream—without interrupting or checking the free downward motion of any of the stream particles at the place of severance—and for projecting the cut off "gobs", at an accelerated velocity, into the receiving receptacle, without arresting the movement of the latter.

In the illustrative construction shown in Figs. I to VI inclusive, the two shear blades S, S—which are of the usual "cat's eye" form—are detachably secured to the cross legs of a pair of inverted U-shaped arms, 80—81, which are pivotally connected, like the leaves of an ordinary hinge, by the pintle pins 82—83, that are secured to, or formed integral with, the tubular side sleeves 84—84, of a vertically movable cage, which slides up and down on the guide rods 85—85 of a stationary frame M. The side members 84—84 are provided at their lower ends with rectangular heads 86—86, which are rigidly cross connected by the bolts 87—87, that serve to hold the connected parts in proper assembled position, with the pintle elements 82—83 in axial alignment. The tubular sleeves 84—84 are also provided at their upper ends with a second pair of pintle pins 88—88, which are pivotally connected, by the links 89—89, with the inner ends of a pair of actuating levers 90—90, that are flexibly attached, at their outer extremities, to the frame M, by the shackle bars 91—91. The levers 90—90 are pivotally connected, at a common intermediate point in their length, to the sides of a cylinder 92, by the stud shaft bolts 93—93; and the cylinder 92 is mounted to reciprocate axially on a hollow piston rod 94, which is attached, at its lower end, to the base plate of the frame M, and is supported, at its upper extremity, on a heavy cross head, 95, that is carried by two vertical posts 96—96. A piston 97 is secured to the central solid portion of the piston rod 94, and is provided on each side with a short cylindrical hub member which is adapted to enter a corresponding recess in the adjacent head of the cylinder 92 when the latter is at the limit of its up or down movement; and the rod 94 is provided with two port openings 98 and 99, which are positioned at the ends of these hub members and afford communication between the two ends of the cylinder 92 and the corresponding ends of a reversing valve chamber 100, whose central portion is connected to the high pressure supply line 64. The chamber 100 contains a double Janus faced poppet valve assembly 101, which is moved in one direction—(to open the upper end of the cylinder 92 to the atmosphere and put the lower end thereof in communication with the pressure conduit 64)—by the edge cam 102, that revolves with the cam 58; and which is moved in the opposite direction—(to exhaust air from the lower end of the cylinder 92, and admits pressure fluid to the upper end thereof)—by the compression spring 103.

The side legs of each U-shaped shear blade support (80 or 81), are provided with rollers 105, which are mounted on pivot pins 106—106 that may extend across the space between these legs (parallel with the connecting bolts 87—87), or may each terminate at the faces thereof; and a cooperative pair of cam dogs 107, 107, are pivotally mounted, (at 108—108) on the base of the frame M, and are normally held in the full line position of Figs. I, III and IV (against the stop block 109) by the tension springs 110—110. In this position the inwardly projecting upper ends 111, of the members 107—107, are positioned below and in the path of movement of the rollers 105—105 etc., and serve to move the shear blades to closed position (as shown in dotted lines in the lower portion of Fig. I) when the cage frame 84—86—87 etc., is moved downwardly by the piston-cylinder-lever and link-assembly 92—93—90—89 etc. Each of the side legs of the arms 81—82 is provided with a downwardly projecting tooth 112, that is adapted to engage with a double faced dog 114 which is slidably mounted in the head 86, and is normally held in engaging position, with the tooth elements 112—112 by the pivoted lever and spring elements 115 and 116 (see Fig. I). A cylinder 117 is mounted on the base plate of the main frame M, and is connected at its center, to the upper end of the hollow piston rod 94 (as indicated by the broken dotted line connections 118 of Figs. I and IV); and this cylinder contains two oppositely moving pistons (120), which are attached to the piston rods 121, 121, that engage with adjustable screws 122, 122, in the arms of the frames 107—107. When compressed air is admitted to the upper end of the cylinder 92 (to raise and hold the shear cage in its upper position—as shown in the drawings), it is concurrently admitted to the cylinder 117 to move the piston and piston rods (120—121 etc.) outwardly, and rock the frames 107 away from each other, so as to carry the roller engaging dogs 111—111 out of the path of movement of the rollers 105, 105 etc.

The operation of this shear mechanism is as follows: At the proper interval in the cycle of feed action—preferably just after the cam 58 has closed, or nearly closed, the valve 56, and thus produced a natural "necking" of the outflowing stream in the manner previously explained—the cam 102 acts to depress the valve member 101, thus permitting the compressed fluid, in the cylinder 117 and in the upper part of the cylinder 92, to exhaust to the atmosphere, and concurrently establishing communication between the lower end of the cylinder 92 and the high pressure line 64 (as shown in Fig. I). The escape of the actuating fluid from the cylinder 117 permits the springs 110 to snap the cam elements 111—111—111—111 into operative position under the shear cage roller 105—105—105—105; and this will occur before the cylinder 92 begins to move downwardly because the port opening 98 is, at first, partially throttled by the engagement of the hub on the lower face of the piston 97 with the cooperating recess in the lower head of the cylinder. The initial downward movement of the cylinder-link-and-cage assembly, 92—90—89—84—83 etc., engages the rollers 105 with the cam dogs 111 and closes the shear blades S—S to sever the flowing stream of glass by a combined and concurrent transverse and axial movement;—the ratio between these two movements and the resultant angle of cut (see Fig. VI) being determined and controlled by the contour of the roller engaging cam terminals 111—111 etc.

Each of the shear frames 80 and 81 is also preferably provided with removable, semi-cylindrical stream engaging sleeves or guards 125—125 (see Figs. I and III) whose inner diameter is slightly larger than that of the corresponding section of the glass stream, and whose upper ends are positioned in close proximity to the lower faces of the shear blades S—S, and are so shaped as to conform closely to the severed end of the cut off "gob" or mold charge; and as soon as this has been completely separated from the super-adjacent oncoming portion of the flowing stream, (by the meeting of the shear blade edges), the downward movement of the now closed shear-blade-guard-sleeve elements, is very rapidly accelerated (by the full opening of the cylinder port 98) and the severed gob is projected downward at a high velocity—which is very substantially greater than that imparted to it by gravity action alone—and is thus delivered to the receiving receptacle at such a speed that it can be transferred thereto without stopping the mold carrier, and with such an increased momentum that its impact with the bottom of the mold cavity will cause the soft hot plastic mass to completely fill the said cavity (to the required depth) even though the initial shape of the severed charge is quite different from that of this cavity.

The initial speed of downward movement of the closing shear blades S, S, is preferably so controlled—with respect to their concurrent transverse motion—that this movement is somewhat more rapid than the flow of the stream particles, under the expulsion forces then acting on the glass; so that the upper surfaces of the shear blades are never in contact with the previously cut portions of the stream, (see Fig. VI), and can, therefore, never check, or chill these oncoming parts, or affect in any way the action of the feed mechanism (previously described) in producing a continuous, uninterrupted discharge of molten material from the delivery orifice F. The degree of acceleration, and of increased speed of delivery, which is imparted to the cut off "gob", may be varied and controlled, within wide limits, by varying the pressure in the supply line 64—(which may, if necessary, be connected to a different source of fluid pressure than that which furnishes the air to the control valve 56, and the conduit 52)—or by changing the cross sectional area of the cylinder 92; or by varying the length of travel of the shear carriage on the guides 85—85; or in various other ways which will be readily understood by engineers.

When the cylinder 92 approaches the lower limit of its downward travel the cylinder boss on the upper face of the piston 97 enters the recess in the top cylinder head, and throttles the escape of air from the port 99, thus trapping a certain quantity of air in the upper part of the downwardly moving cylinder, which will act as an elastic buffer or cushion to arrest the movement of the cylinder actuated parts and bring them to rest without detrimental shock or jar. At the termination of this movement the end of the lever 115 comes in contact with an adjustable screw 126, and moves the dog 114 out of engagement with the shear arm teeth 112—112 and permits the shear arms 80 and 81 to be thrown apart to their open position (by suitable springs not here shown). The continued rotation of the cam 102 then permits the reversing valve 101 to be lifted by the spring 103; and the concurrent admission of compressed fluid to the cylinder 117 and to the upper end of the cylinder 92, first opens the cam arms 107—107 (and moves the cam ends 111—111 out of the path of the rollers 105—105 etc.), and then lifts the shear cage to the top of the guides 85;—the end of this lifting movement being gradually cushioned and checked, as before, by the throttling of the lower piston rod port 98 and the resultant trapping of air in that end of the cylinder.

Each entire cycle of movement of the shear mechanism occupies only a small part of the intervals between successive severing operations; and the time during which the lower faces of the shear blades S—S, or the inner surfaces of the delivery-guard-elements 125—125 are in contact with the hot glass is so very short that these parts cannot become unduly heated—and it is desirable that they remain at the maximum working temperature of the receiving molds—and cannot, on the other hand, sensibly chill the outer surfaces of the delivered mold charges. In order to obtain the best results the removable guard delivery sleeves are changed when there is any substantial alteration in the shape or mass of the successively cut off section of the flowing stream; and their inner surfaces are preferably chromium plated and highly polished to prevent corrosion and transfer of heat either by direct conduction or by radiation. As already stated the shear blades S, S, are also removably mounted on the arms 81 and 82, so that they may be easily replaced when the edges become dulled, and are preferably made of a special alloy steel (such as "clearite"), which has been either heat treated, or "nitrided" to obtain the maximum resistance to wear. The engaging surfaces of these blades are, of course, ground to the arc of movement about the coaxial pintle pin supports 82—83; and the mounting is such that their engaged surfaces are maintained in spring contact with each other during their passage through the glass.

With the preceding disclosure as a guide those skilled in this art will be enabled to fully understand and appreciate the characteristic features of the hereinbefore described improvements, and the distinguishing results obtained thereby—even though some of these features and results may not have been explained in extenso—and will also be enabled to design and construct other alternative and equivalent organizations which will be capable of practicing my present invention, and of attaining, in whole or in part as may be desired, the objects and advantages of my improved procedure and apparatus. The specific illustrative embodiments of my invention, which are herein shown and described, are therefore to be regarded only as exemplary of various mechanisms by which one may obtain the improved results above set forth; and it will be further understood that various departures may be made from these illustrative constructions—in form, proportions of parts, or in relative sequence of movements—without departing from the principles of the invention in its broader aspects, (as set forth in the accompanying claims), and without sacrificing or impairing its characteristic advantages.

It should also be understood that several structures and procedures have been devised by me for utilizing a continuously flowing stream of molten glass in connection with the formation of mold charges and in which the flow of glass through the delivery orifice is never less than a gravity flow under the existing head, and that various details of procedure and such apparatus here illustrated and described but not claimed are claimed in one or another of my following copending applications 679,889, filed July 11, 1933, 687,042, filed Aug. 28, 1933, 687,044, filed Aug. 28, 1933, 716,626, filed Mar. 21, 1934, 716,627, filed Mar. 21, 1934 and 730,935, filed June 16, 1934.

What I claim is:

1. A method of forming charges of molten glass, which consists in maintaining a supply body of molten glass, withdrawing and segregating a quota of glass from such body, withdrawing a second quota of molten glass from said body while delivering glass from the quota first withdrawn to a pool of glass maintained over a flow orifice, segregating the second quota, delivering glass from said second quota, and forming mold charges from the resulting flow of glass through said orifice.

2. In a feeder for molten glass, a receptacle having a flow orifice and two chambers in communication with the orifice and having ports opening into said receptacle, a separate means for closing each of said ports, means for drawing molten glass into each such chamber and means cooperating with the glass drawing means for establishing communication between said chambers and said receptacle.

3. In a feeder for molten glass, a receptacle having a flow orifice, two chambers each having a delivery port communicating with said orifice, and an inlet port communicating with said receptacle, a separate means for controlling each of said inlet ports, and common means for alternately controlling said delivery ports.

4. In combination in a feeder for molten glass a forehearth, a receptacle within the forehearth having a glass submerged flow orifice formed therein, two chambers each having a delivery port communicating with said orifice and an inlet port communicating with said forehearth, a flow responsive valve located within said receptacle for controlling said delivery ports, a separate valve for controlling each inlet port, means for subjecting said receptacle and each of said chambers to fluid under pressure, means for subjecting each of said chambers to vacuum pressure, electrical means for controlling the withdrawal of gaseous fluid from each chamber, timing means for controlling the delivery of fluid under pressure to each of said chambers and a shear mechanism comprising blades, means for moving said blades toward and from a cutting position and means operating in timed relation with said first mentioned means for moving said blades transversely while moving toward a cutting position.

5. In a feeder for molten glass, a receptacle having a flow orifice, two chambers each having a port communicating with said receptacle, a gate for each port, means for introducing sub-atmospheric pressure into said chambers, and means responsive to the introduction of sub-atmospheric pressure into each chamber for operating said gate to establish communication between each of said chambers and said receptacle.

6. A method of feeding molten glass in a suspended stream through an orifice which consists in withdrawing a quota of material from the supply of molten glass, applying a discharging force to said quota to move it into a delivery position over the orifice while preventing its return to the supply, applying a discharging force to the material over the orifice to expel it therethrough, and maintaining a differential between the magnitudes of the two discharging forces.

7. A method of feeding molten glass in a suspended stream which consists in withdrawing a quota of material from a supply of molten glass, applying a discharging force to said quota to move it into a delivery position over an orifice while preventing its return to the supply, applying a discharging force to the material over the orifice to expel it therethrough, maintaining a differential in the magnitude between the two discharging forces, and periodically reducing the magnitude of the combined forces to produce a necking in the stream.

8. A method of feeding molten glass in a suspended stream which consists in withdrawing a quota from a supply of molten glass, subjecting said quota to a force to move it into a delivery position while preventing a return therefrom to the supply, simultaneously withdrawing another quota from said supply, subjecting the material over the orifice to an expelling force of less magnitude than the force applied to said quota, periodically reducing the magnitude of the expelling force to produce a necking in the stream and then applying a force to the second quota to move it into the delivery position.

9. A method of feeding molten glass in a suspended stream which consists in maintaining a body of molten glass, withdrawing and segregating a quota of glass from said body, withdrawing and segregating a second quota of glass from said body, alternately moving glass from said segregated quotas to a pool of glass maintained in a delivery position over an orifice and subjecting the pool over the orifice to an expelling force of periodically varied intensity.

10. A method of feeding molten glass in a suspended stream which consists in maintaining a body of molten glass, withdrawing and segregating a quota of glass from said body, withdrawing a second quota of glass from said body while delivering glass from the quota first withdrawn to a previously segregated pool maintained over an orifice, segregating the second quota, delivering glass from said second quota to the pool over the orifice while replenishing said first quota, and subjecting the pool of glass over the orifice to a continuously applied, periodically varied expelling force.

11. A method of forming a succession of mold charges which consists in maintaining a segregated pool of molten glass above an open flow orifice by alternately delivering glass thereto from quotas previously segregated from a body of glass, causing the glass to flow from said pool through the orifice in a stream of regularly recurrent enlarged sections, and dividing the stream at the points of reduced cross section into a succession of mold charges.

12. A method of forming a succession of mold charges from a body of molten glass which consists in maintaining a segregated pool of molten glass above a flow orifice, maintaining a continuous flow through said orifice by subjecting the surface of such pool to a continuously applied, progressively varied expelling force, continuously replenishing the pool of glass above the flow orifice by successively delivering glass thereto from quotas previously withdrawn and segregated from said body, and in dividing said flow into charges.

13. A method of forming a succession of mold charges from a body of molten material which comprises segregating a quota of molten material from such body, causing material from such quota to flow into a pool of molten glass above a submerged orifice, continuously maintaining a discharging force on the material moving toward such pool, continuously moving the glass in said pool through the orifice by subjecting the pool to an expelling force and periodically increasing the rate of flow through such orifice by supplementing such expelling force.

14. A method of delivering a succession of mold charges from a mass of molten material which consists in maintaining a body of such material in communication with a continuously open flow orifice, periodically segregating material from said mass and increasing the gravity head of said body by delivering the material so segregated to said body and periodically severing the stream issuing from said orifice.

15. A method of producing a succession of mold charges from a mass of molten glass which consists in maintaining a segregated pool of molten glass in communication with an open orifice, continuously replenishing said pool by withdrawing and segregating successive quotas of glass from such mass and discharging such segregated quotas into said pool, and periodically subjecting said pool to an expelling force other than gravity to accelerate the flow through the orifice.

16. A method of feeding molten glass from a supply body in a pulsating stream through an orifice which consists in maintaining a pool of glass over said orifice, constantly subjecting the surface of said pool to an expelling force of periodically varied intensity, segregating a quota of molten glass from said supply body, discharging the segregated quota into said pool to increase the gravity head above the orifice while simultaneously segregating another quota from said body and discharging the second quota into said pool to again increase the gravity head over the orifice while simultaneously segregating another quota from such body.

17. In a feeder for molten glass, a receptacle having a flow orifice, two chambers each having a delivery port communicating with said orifice, and an inlet port communicating with said receptacle, means for controlling each of said inlet ports, and means for alternately controlling said delivery ports.

18. A method of forming a succession of mold charges from a mass of molten glass, which consists in alternately withdrawing quotas from said mass, segregating each such quota so withdrawn by shutting off communication between it and such mass and alternately delivering glass from such withdrawn quotas to a pool of molten glass maintained over a flow orifice under such conditions that one such quota is being replenished with glass from such mass while glass is being delivered from the other to such pool.

19. A method of forming a succession of mold charges from a mass of molten glass, which consists in alternately withdrawing quotas of glass from spaced portions of said mass, segregating each such quota so withdrawn by shutting off communication between it and such mass, alternately delivering glass from such withdrawn quotas to a pool of molten glass maintained over a flow orifice under conditions such that one such quota is being replenished with glass from such mass while glass is being delivered from the other to such pool, and severing the stream of glass issuing from said orifice in timed relation with such deliveries to such pool.

FRANK L. O. WADSWORTH.